United States Patent
Haenen et al.

(10) Patent No.: US 7,401,964 B2
(45) Date of Patent: Jul. 22, 2008

(54) LIGHT-GUIDING SYSTEM COMPRISING A PLATE-LIKE LIGHT-EMITTING ELEMENT

(75) Inventors: Ludovicus Johannes Lambertus Haenen, Eindhoven (NL); Johannes Petrus Maria Ansems, Eindhoven (NL); Nicola Bettina Pfeffer, Eindhoven (NL); Edwin Van Lier, Eindhoven (NL); Augustinus Gregorius Henricus Meijers, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 142 days.

(21) Appl. No.: 10/570,439

(22) PCT Filed: Aug. 23, 2004

(86) PCT No.: PCT/IB2004/051526

§ 371 (c)(1),
(2), (4) Date: Mar. 2, 2006

(87) PCT Pub. No.: WO2005/024477

PCT Pub. Date: Mar. 17, 2005

(65) Prior Publication Data

US 2007/0019438 A1    Jan. 25, 2007

(30) Foreign Application Priority Data

Sep. 8, 2003    (EP) .................................. 03103317

(51) Int. Cl.
*F21V 7/04* (2006.01)
*G02B 6/04* (2006.01)

(52) U.S. Cl. ..................... 362/621; 362/554; 362/581

(58) Field of Classification Search ................. 362/621, 362/633, 615, 560, 561, 554, 580
See application file for complete search history.

(56) References Cited

U.S. PATENT DOCUMENTS

| 4,528,617 | A | | 7/1985 | Blackington et al. |
| 5,101,325 | A | * | 3/1992 | Davenport et al. .......... 362/628 |
| 2002/0167820 | A1 | | 11/2002 | Haering et al. |

FOREIGN PATENT DOCUMENTS

| EP | 0453092 A | 10/1991 |
| EP | 0936403 A | 8/1999 |
| EP | 0936403 B1 | 8/1999 |
| JP | 10283817 A | 10/1998 |

* cited by examiner

*Primary Examiner*—John A Ward

(57) ABSTRACT

A light-guiding system comprising a plate-like light-emitting element (20) provided with means for emitting light through at least part of its front surface (22). Light is coupled in by a plate-like light-guiding member (21) connected to a lateral side of said lightemitting element (20). One or more interstices (25) are present between said light-emitting element (20) and said light-guiding member (21).

15 Claims, 6 Drawing Sheets

LIGHT-GUIDING SYSTEM COMPRISING A PLATE-LIKE LIGHT-EMITTING ELEMENT

The invention relates to a light-guiding system comprising a plate-like light-emitting element provided with means for emitting light through at least a part of its front surface, and means for coupling in light into said light-emitting element Such a system is disclosed in US-A-2002/0167820. This publication describes a light-guiding system for improving the lighting conditions of the passenger compartment of a motor vehicle, wherein a plate-like light-emitting element is arranged in the area of the interior lining of the vehicle roof. Light is coupled in into the light-emitting element through one or more lateral surfaces of the light-emitting element, and light is coupled out through the large front surface of the light-emitting element into the passenger compartment of the vehicle in a homogeneous manner. The light is coupled in into the light-emitting element by means of a light-generating unit, such as a fluorescent tube, extending along the lateral surface of the light-emitting element.

The plate-like light-emitting element may be a flat light-guiding element, but it may alternatively be curved, resulting in a two-or three-dimensional curved shape. Such a shape may, for example, correspond to the shape of a vehicle roof or a part thereof. The said lateral surface may be flat and rectangular, but it may also have another shape, for example curved to a certain degree.

Depending on the refractive index of the material of a light-guiding member, light will be reflected back into that light-guiding member by the surfaces of this member if said surfaces are smooth and the angle of incidence is greater than a certain value, i.e. the angle of total reflection. The angle of incidence is the angle between the light beam and a line perpendicular to the surface to which the light beam is directed.

Appropriate materials for guiding light are transparent thermoplastics, in particular polymethyl methacrylate (PMMA) or polycarbonate (PC). Such materials can be shaped, for example, by an injection molding process, by an extrusion process, or by a material-removing laser operation.

Said means for emitting light through at least part of the front surface of the light-emitting element are described in US-A-2002/0167820. It may be a structured rear side of the light-emitting element obtained by roughening, embossing or boring of the material. Another possibility is the introduction of scattering centers, such as refractive pigments, in the material of the light-emitting element.

Said means for coupling in light into said light-emitting element may be a light-generating unit, such as a fluorescent tube, extending along a lateral surface of the light-emitting element. As an alternative, a number of light-emitting elements, such as light-emitting diodes (LEDs), may be arranged in a row along said lateral surface. However, in all these cases, only a portion of the light radiated by the light-generating unit will directly reach the lateral surface for coupling in the light into the light-emitting element. The use of a reflector behind the light generating unit can increase the portion of the light radiation that reaches said lateral surface, but still there is much more light generated near said lateral surface than can be coupled in into the light-emitting element.

Furthermore, it is often desired that the directions of the light beams coupled in into the light-emitting element enclose relatively small angles with the direction perpendicular to said lateral surface. This will improve the guidance of the light in the light-emitting element and it will cause a further penetration into that element.

The object of the invention is to provide a light-guiding system whereby light is coupled in into a plate-like light-emitting element, whereby there is only little loss of light near said lateral surface, and whereby the light beams of the coupled-in light radiation are directed at relatively small angles to the direction perpendicular to said lateral surface.

In order to accomplish that objective, said means for coupling in light comprise a plate-like light-guiding member that is connected to a lateral side of said light-emitting element and light source means for coupling in light into said light-guiding member, wherein an interstice is present between said light-emitting element and said light-guiding member, said interstice extending over at least part of the area between said light-emitting element and said light-guiding member, and said interstice being directed substantially perpendicularly to said front surface. An interstice is defined as a space between two substantially parallel surfaces. The light-guiding member is an intermediate between the light source means and the light-emitting element and ensures an appropriate entry of the light into the light-emitting element.

Preferably, the light-guiding member and the light-emitting element have a thickness between 0.5 mm and 15 mm, preferably between 2 mm and 7 mm.

Only light beams having a relatively small angle of incidence can pass the provided between the light-guiding member and the light-emitting element interstice. Light beams having an angle of incidence that is greater than the angle of total reflection will be reflected back into the light-guiding member and may be reflected by the surfaces of the light-guiding member once or several times until its angle of incidence at the bordering surface of the interstice is small enough to pass that surface.

One interstice may cover the major portion of the area between the light-guiding member and the light-emitting element, but preferably a plurality of separate interstices are present substantially lying in the same plane and extending over the major portion of said area. The light-guiding member and the light-emitting element may contact each other between the interstices to connect them.

Preferably, the distance between the surfaces bordering the interstice is less than 3 mm, preferably between 0.5 mm and 2 mm, and normally the interstice will contain air. Also preferably, the distance between the surfaces bordering the interstice is between 0.5 and 1.5 times the thickness of the light-emitting element.

The two parts, i.e. the light-guiding member and the light-emitting element, may be connected to each other in the area between them where the interstice does not extend, or, in the case of more interstices, in the areas between the different interstices. They may be glued together, but in one preferred embodiment said light-emitting element and said light-guiding member are one piece of the same material produced in an injection molding operation, both being made jointly in one operation.

Preferably, the interstice or the interstices, as the case may be, is or are made during the injection molding operation in that the mold is appropriately shaped. In another preferred embodiment, the interstices are machined after the molding operation, for example by means of a material-removing laser operation. The interstice may extend over the entire thickness of the plate-like light-guiding member and light-emitting element, so that it reaches to the rear surface and the front surface of this member and this element, respectively. However, the interstice may also extend to only one of these surfaces, preferably the rear surface, so that the front surface of the two parts is uninterrupted.

In one preferred embodiment, said light-guiding member has a substantially flat plate-like and triangular shape, wherein a shorter side of the triangle comprises a lateral surface for coupling in light into said light-guiding member, and wherein a longer side of the triangle comprises a coupling-out surface which faces a surface of the light-emitting element for coupling in light into this light-guiding element, and wherein the third side of the triangle comprises a number of surfaces that are positioned at an angle to the direction of said third side, all said surfaces being perpendicular to the plane of said plate-like shape.

Preferably, the plate-like light-guiding member has a substantially right-angled triangular shape, said shorter side and said longer side of the triangle enclosing the substantially right angle, while said third side is the hypotenuse of the triangle, which side comprises said number of surfaces which are positioned at an angle of about 45° to said coupling-out surface. Preferably, said third side comprises a number of surfaces having alternating directions, at said angle to the direction of said third side and substantially perpendicular to said shorter side.

In this embodiment, the light-guiding member functions as an intermediate optical waveguide, wherein the shorter side of the triangle can be made as short as is required to make use of appropriate light source means and the longer side may have a length corresponding to the length of the oblong lateral surface of the plate-like light-emitting element. The number of surfaces at a certain angle along said third side of the triangle is preferably more than six, more preferably more than twelve.

In one preferred embodiment, at least said surfaces positioned at an angle to said third side are provided with a light-reflecting material. All surfaces of the light-guiding member, except for the surface bordering the interstice or interstices, may be provided with a light-reflecting coating to increase the reflection of light if the surface is not smooth enough to reflect all light having an angle of incidence greater than the angle of total reflection, or if there are light beams having an angle of incidence smaller than the angle of total reflection. Such a coating may also protect the relevant surfaces from undesired optical contact with other materials.

Preferably, said light source means for coupling in light into said light-guiding member comprise a number of light transmission rods, each of said light transmission rods having an end which is connected to said lateral surface of said plate like light-guiding member. Preferably, the light transmission rods are made of the same light-guiding material as the material of the light-guiding member and preferably have a diameter between 0.2 mm and 5 mm, more preferably between 1 mm and 3 mm.

Preferably, the light transmission rods are positioned near said lateral surface parallel to each other in one or more planes perpendicular to said coupling-in surface of the light-guiding member, and the distance between said rods near said surface is preferably less than 5 mm, more preferably between 1 mm and 2 mm.

To connect the light transmission rods to the coupling-in surface of the light-guiding member, said surface may be provided with bores in which the light transmission rods fit. The flat end surface of the light transmission rod thus faces the flat bottom of the bore, so that the light beams can pass through both surfaces with small losses of light.

In one preferred embodiment, said light-guiding member and said light transmission rods are one piece of the same material, for example produced in an injection molding operation, so that the light can be guided from a light source through the light transmission rods and the light-guiding member without any interruption, i.e. without passing any surface, so that there is no loss of light.

Preferably, the light-emitting element is also of the same piece of material, i.e. all parts of the product: the light-emitting element, the light-guiding member, and the light transmission rods are produced in an injection molding operation, the whole product being made in one operation. The interstices may be made in the injection molding process, or afterwards, for example in a material-removing operation with a laser beam.

Preferably, the other ends of the light transmission rods are bound together so as to form a member for coupling in light into said light transmission rods. Such a member may have a substantially cylindrical shape, a rectangular shape, or any other shape. The end surfaces of the light transmission rods thus joined together can be placed in front of a lamp or other light source, a reflector behind the lamp providing a light radiation comprising substantially parallel light beams, so that there are relatively small angles between the direction of the light radiation in the light transmission rods and the longitudinal direction of these rods. Said other ends of the light transmission rods may also be bound together into more than one member.

In one preferred embodiment, surfaces of the light-guiding member and/or the light-emitting element and/or the light transmission rods are provided with a coating having a lower refractive index than the material of said member, element, or rods, respectively. Such a coating, or cladding, prevents the surface of the light-guiding material from being contacted by material or becoming contaminated, for example by fingerprints, with material having the same or a higher refractive index making optical contact with the surface of the light-guiding material, resulting in an undesired coupling-out of light.

For example, such a cladding makes it possible to attach a fabric against the front surface of the light-emitting element by means of glue such that the light can shine through the fabric. Furthermore, the light-guiding element may be fixed by means of glue while being mounted.

The invention also relates to a method of coupling in light into a plate-like light-emitting element provided with means for emitting light through at least part of its front surface and means for coupling in light into said light-emitting element, wherein light is coupled in by means of a plate-like light-guiding member that is connected to a lateral side of said light-emitting element, wherein light is coupled into said light-guiding member, and wherein at least part of the light radiation leaving the light-guiding member and entering the light-emitting element passes an interstice which is present between said light-emitting element and said light-guiding member, said interstice extending over at least part of the area between said light-emitting element and said light-guiding member, and said interstice being directed substantially perpendicularly to said front surface.

The invention will now be further elucidated by means of a description of some embodiments of a light-guiding system, wherein reference is made to the drawing comprising Figures which are only schematic representations, in which.

Figure 1:
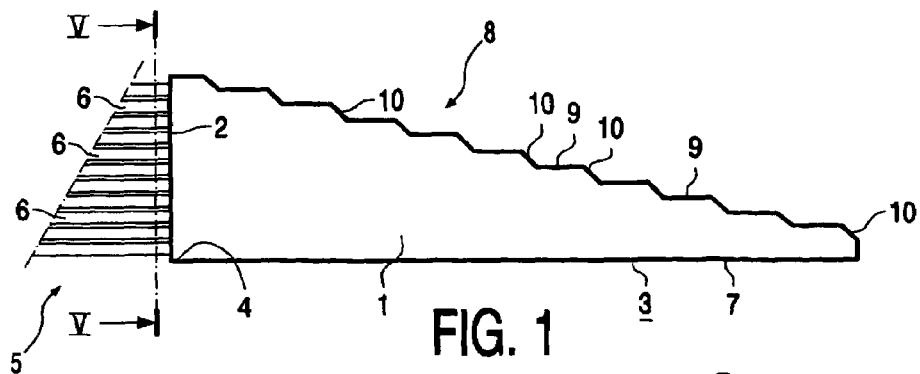
FIG. 1 is a plan view of a plate-like triangular light-guiding member.

FIG. 1 shows a plate-like and substantially triangular light-guiding member 1. In this example of an embodiment, the material of the light-guiding member 1 is polycarbonate, which is a transparent thermoplastic material that can be shaped by means of an injection molding operation. The outer surfaces of the product that is produced by the injection molding operation are smooth, so that light that is coupled in will be reflected by said surfaces, provided that the angle of incidence on the relevant surface is greater than the angle of total reflection (i.e. the critical angle of total reflection). The angle of total reflection depends on the value of the refractive index of the material of the light-guiding member and the value of the refractive index of the medium bordering the relevant surface of the light-guiding member.

The refractive index of polycarbonate is about 1.6 and the refractive index of air is about 1, so the angle of total refraction is about 39°. This means that all light beams having an angle of incidence greater than 39° on the relevant surface of the light-guiding member 1 will be totally reflected back into the material of the light-guiding member 1. Only a light beam having an angle of incidence smaller than 39° will be coupled out.

In this embodiment, the light-guiding member 1 has, in plan view, a substantially right-angled triangular shape, a shorter side 2 and a longer side 3 of the triangle enclosing the substantially right angle 4. In the represented embodiment, the thickness of the plate-like light-guiding member 1 is about 6 mm.

The shorter side 2 is provided with light-coupling means 5 for coupling in light into the light-guiding member 1. The light-coupling means 5 comprise a number of light transmission rods 6 positioned parallel to each other in a plane parallel to the plane of the plate-like shape of the light-guiding member 1, at least near this member 1. The light transmission rods 6 and the light-guiding member 1 are produced in one injection molding operation, and therefore they are one integral piece of the same material. FIG. 1 only shows eleven light transmission rods 6, but in practice there may be many more light transmission rods connected to the light-guiding member 1. The light transmission rods 6 may also be located in two of more different parallel planes.

Figure 2:
FIG. 2 is a side elevation of the light-guiding member viewed from the lower side in FIG. 1.

The longer side 3 comprises a coupling-out surface 7 positioned perpendicularly to the plane of the plate-like light-guiding member 1. FIG. 2 shows the coupling-out surface 7 in front elevation. Light will be coupled out from the light-guiding member 1 if the light beams have an angle of incidence with respect to the coupling-out surface 7 of less than 39°, this being the angle of total reflection in the described embodiment.

Figure 3:
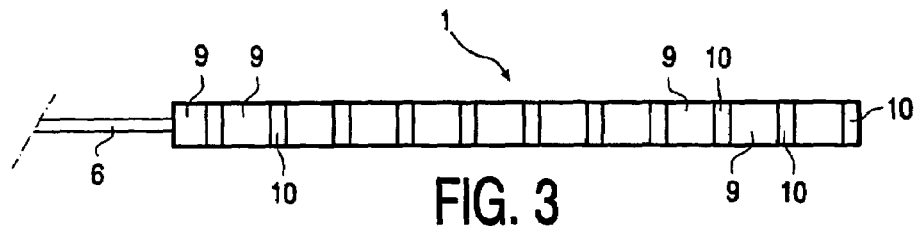
FIG. 3 is a side elevation of the light-guiding member viewed from the upper side in FIG. 1.
Figure 4:
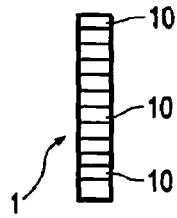
FIG. 4 is a side elevation of the light-guiding member viewed from the right-hand side in FIG. 1.

The third side of the triangular shape of the light-guiding member 1, the hypotenuse 8, comprises a number of surfaces 9,10, having alternating directions. All surfaces 9 are positioned parallel to the coupling-out surface 7 and all surfaces 10 are positioned at an angle of 45° to the coupling-out surface 7. The surfaces 9,10 are perpendicular to the plane of said plate-like shape. FIGS. 3 and 4 show the row of surfaces 9 and 10 with alternating directions.

Figure 5:
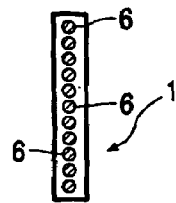
FIG. 5 is a sectional view taken on the line V-V in FIG. 1.

FIG. 5 is a sectional view taken on the line V-V of FIG. 1 and shows the light transmission rods 6. A light transmission rod is also called a light transmission tube. However, it is not a "tube" (i.e. a hollow body), but for light it is in fact a tube, because the light is propagated in the material of the tube and is reflected against the outer surface thereof so that it stays in the tube or rod 6.

The light transmission rod 6 may have a round transverse section, so that its shape is cylindrical. Alternative shapes of the transverse section are possible, however, for example a hexagonal or a square shape, in order to facilitate the creation of a bundle without space between the light transmission rods 6.

The transverse section of the light transmission rods 6 may also be different along its length. In one preferred embodiment, at least a portion of a light transmission rod 6 has an increasing diameter in the direction towards the light-guiding member 1. The light beams will thus become more and more parallel when passing through the light transmission rod. Such an increase of the diameter is preferably applied near the light-guiding member 1 to which the rods 6 are connected, and preferably the diameter of the light transmission rods 6 near said member 1 is more than 1.5 times, more preferably more than twice the diameter further away from said light-guiding member. Such an increasing diameter can be easily produced by an injection molding operation of the light transmission rods 6.

By means of the light-guiding member 1, light can be coupled in through a relatively small (short) area at the shorter side 2 and can be coupled out through a relatively large (long) area, i.e. the coupling-out surface 7 at the longer side 3. Depending on the manner of coupling in of the light into the light transmission rods 6, the direction of the radiation can be given a very small angle with respect to said longitudinal direction. Therefore, the radiation of the coupled-in light entering the light-guiding member 1 through the light transmission rods 6 has a small angle with respect to the longitudinal direction of the light transmission rods 6, and are therefore directed substantially parallel to the coupling-out surface 7.

So, the light enters the light-guiding member 1 mainly with a direction parallel to the coupling-out surface 7. Therefore, almost all coupled-in light will hit one of the surfaces 10 with an angle of incidence of about 45°. Since this angle is much greater than the angle of total reflection (being about 39°), most of the light will be reflected in a direction substantially perpendicular to the coupling-out surface 7, or with a relatively small deviation from that direction. All light having an angle of incidence smaller than 39° will be coupled out through the coupling-out surface 7, apart from some small losses of light caused by the passage through the surface 7.

The light-guiding member 1 functions as an intermediate optical waveguide, while the shorter side 2 of the triangle can be made as short as is required to make use of appropriate light-coupling means 5 and the longer side 3 can have a length corresponding to the length of the oblong lateral surface of a plate-like light-guiding element. The number of surfaces 9,10 along the hypotenuse 8 of the triangle can be as large as is required to achieve an appropriate reflection and distribution of the light.

If the angle of total reflection is greater than in this embodiment because of the use of other materials or another surrounding medium, or if reflection is disturbed by a less smooth surface, the surfaces 10 and/or also other surfaces of the light-guiding member may be provided with a light-reflecting material. Such a material, or coating, may also protect the relevant surfaces from undesired optical contact with other materials.

Instead of a reflecting coating, a reflecting mirror may be mounted at some distance to the relevant surface, for example surface 10. There are also high-reflection tapes available that can be attached to the surface in order to provide a full reflection of the light back into the material of the light-guiding member 1.

Furthermore, the two parallel surfaces of the light-guiding member (the front surface and the rear surface) may be provided with a coating of material having a lower refractive index than the material of the light-guiding member 1 itself. Such a coating, or cladding, prevents the surface of the light-guiding material from being contacted by other material or becoming contaminated, for example by fingerprints, with material having the same or a higher refractive index making optical contact with the surface of the light-guiding material, whereby light could be coupled out unintentionally.

Figure 6:
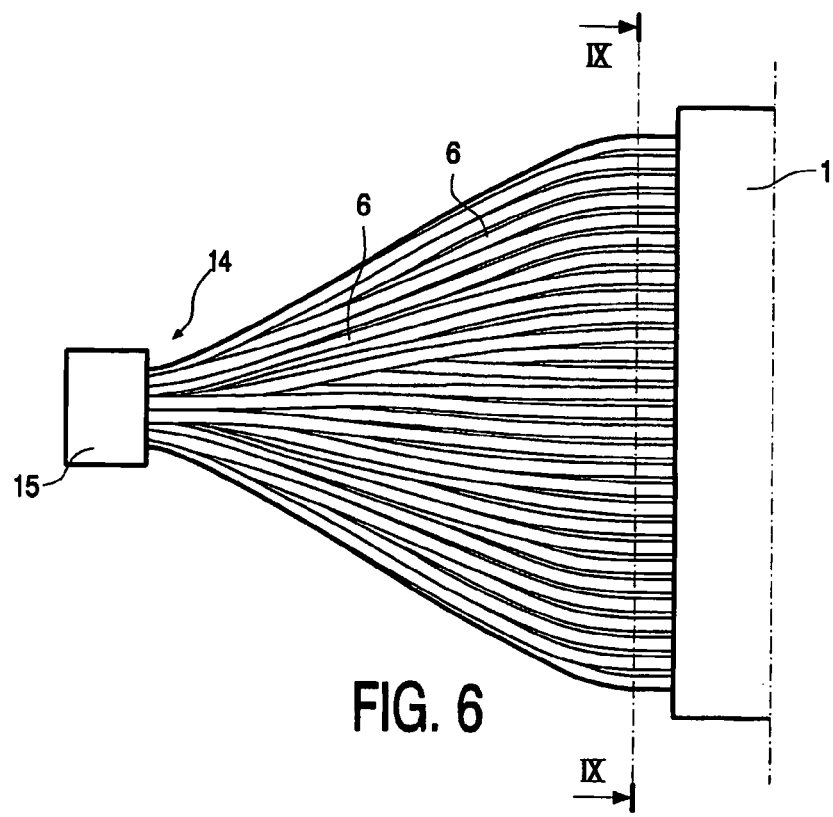
FIG. 6 is a plan view of a optical waveguide comprising light transmission rods.
Figure 7:
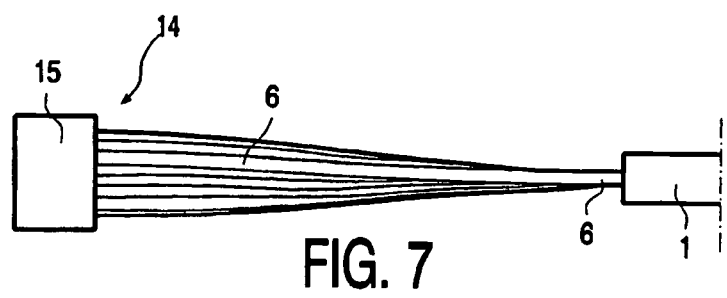
FIG. 7 is a side elevation of the optical waveguide viewed from the lower side in FIG. 6.
Figure 8:
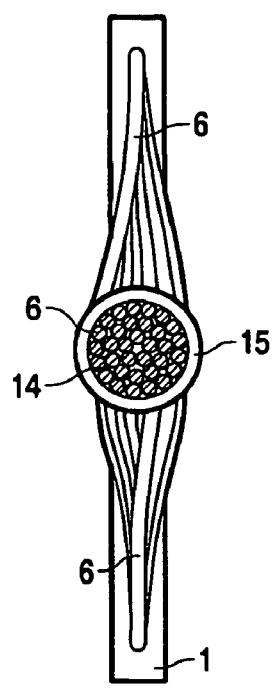
FIG. 8 is a side view of the optical waveguide viewed from the left-hand side in FIG. 6.
Figure 9:
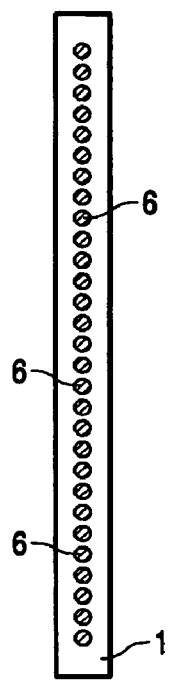
FIG. 9 is a sectional view taken on the line IX-IX in FIG. 6.

FIGS. 6, 7 and 8 show a number of light transmission rods 6 and a portion of the plate-like light-guiding member 1 to which the light transmission rods 6 are connected. Near the light-guiding member 1, the light transmission rods 6 are parallel and positioned in a flat plane, as is shown in FIG. 9, which is a sectional view taken on the line IX-IX in FIG. 6. Further away from the light-guiding member 1, the light transmission rods 6 are positioned closer to each other, and at the end all light transmission rods 6 have become a bundle 14 of parallel rods 6 surrounded by a cylindrical holder 15.

In order to transport light to the light-guiding member 1 through the light transmission rods 6, light has to be coupled in into the light transmission rods 6 at the other ends of these rods 6, i.e. the ends that are not connected to the light-guiding member 1. These ends are present in the cylindrical holder 15. To couple in light, holder 15 can be placed in front of a lamp or other light source, which is not shown in the drawing. Light with substantially parallel radiation can be obtained by means of a reflector behind the lamp or a lens in front of the lamp, which light can be directed to the cylindrical holder 15 such that the light in each light transmission rod 6 substantially has a direction corresponding to the longitudinal direction of the respective light transmission rod 6. The light will thus enter the light-guiding member 1 mainly in one direction. If light-guiding member 1 is a member as shown in FIGS. 1-5, said direction of the light radiation is advantageously as described above. If the light-guiding member 1 is a plate-like optical waveguide for other purposes, however, for example for emitting light through its front side, as will be described below, it is also advantageous to have the light radiation mainly parallel, and perpendicular to a lateral surface of the plate like light-guiding member. Then, the light will distributed in an effective way in the light-guiding member and easily reach locations far away from said lateral surface.

The light transmission rods 6 may have a round transverse section as shown in the Figures. However, it may be advantageous to provide the light transmission rods 6 with another transverse sectional shape, for example a hexagonal shape or a square shape. Then the rods 6 can be easily bound together into a bundle without any space between them. In the case of round rods 6, ends of the rods can be heated while being pressed together in order to eliminate spaces between the rods in the cylindrical holder 15. The rods 6 may even been fused (melted) together in the holder 15. However, any space between the light transmission rods 6 in the holder 15 does not disturb the coupling-in of light into the light transmission rods 6, but there may be more loss of light in that case.

In the described embodiment, the holder 15 has a cylindrical shape. However, the holder may also have another shape, for example a rectangular shape if such a shape corresponds better to the shape of the light source. The light transmission rods 6 may also be divided over more bundles 14, i.e. more holders 15, with the ends of the bundles being located in front of different light sources.

In one preferred embodiment not shown in the Figures, the diameter of each rod varies over its length, the diameter increasing in a direction away from the light-guiding member 1. As was noted above, such a shape improves the transmission of light in that the transmitted light beams are directed more and more parallel to each other during their transmission.

The light transmission rods 6 may have a diameter between 0.2 mm and 5 mm, preferably between 1 mm and 3 mm, and the distance between the rods 6 near the light-guiding member 1 may be between 0.5 mm and 2 mm. The number of light transmission rods 6 may be high, depending on the requirements. The length of a light transmission rod 6 may also depend on the requirements. In general, the lengths of the light transmission rods 6 are different, to enable each of them to bridge the distance between the lateral surface of the light-guiding member 1 and the cylindrical holder 15 in an appropriate way. That distance may be short where the cylindrical holder 15 with the light source is located near the light-guiding member 1, but it is also possible to place the light source and the cylindrical holder 15 far away from the light-guiding member 1, in which case the light transmission rods 6 are arranged in a bundle running from the cylindrical holder 15 to a location near the light-guiding member 1, where the light transmission rods 6 diverge to their individual locations at the lateral surface of the light-guiding member 1.

The light transmission rods 6 as well as the light-guiding member 1 to which the rods 6 are connected are manufactured by means of an injection molding operation. The two parts 1,6 are manufactured together, so that they are one piece of material, being polycarbonate in this example of an embodiment, which material allows sufficient flexibility for the light transmission rods 6. The light can thus be guided without any interruption from the light source at a distance from the light-guiding member 1 to this plate-like light-guiding member 1, its entrance being distributed over the entire lateral surface of the light-guiding member 1 while the radiation of the light is directed substantially perpendicular to this lateral surface.

Said other ends of the light transmission rods 6 are formed into a bundle 14 and surrounded by the holder 15 after the light transmission rods 6 together with the light-guiding member 1 have been manufactured in an injection molding operation. The holder 15 may be a metal or plastic cylinder into which the bundle 14 of light transmission rods 6 is introduced, or it may alternatively comprise two 'half pipes' which are joined together around the bundle 14. As an alternative, the holder 15 may consist of tape wound around the bundle 14 of light transmission rods 6.

Figure 10:
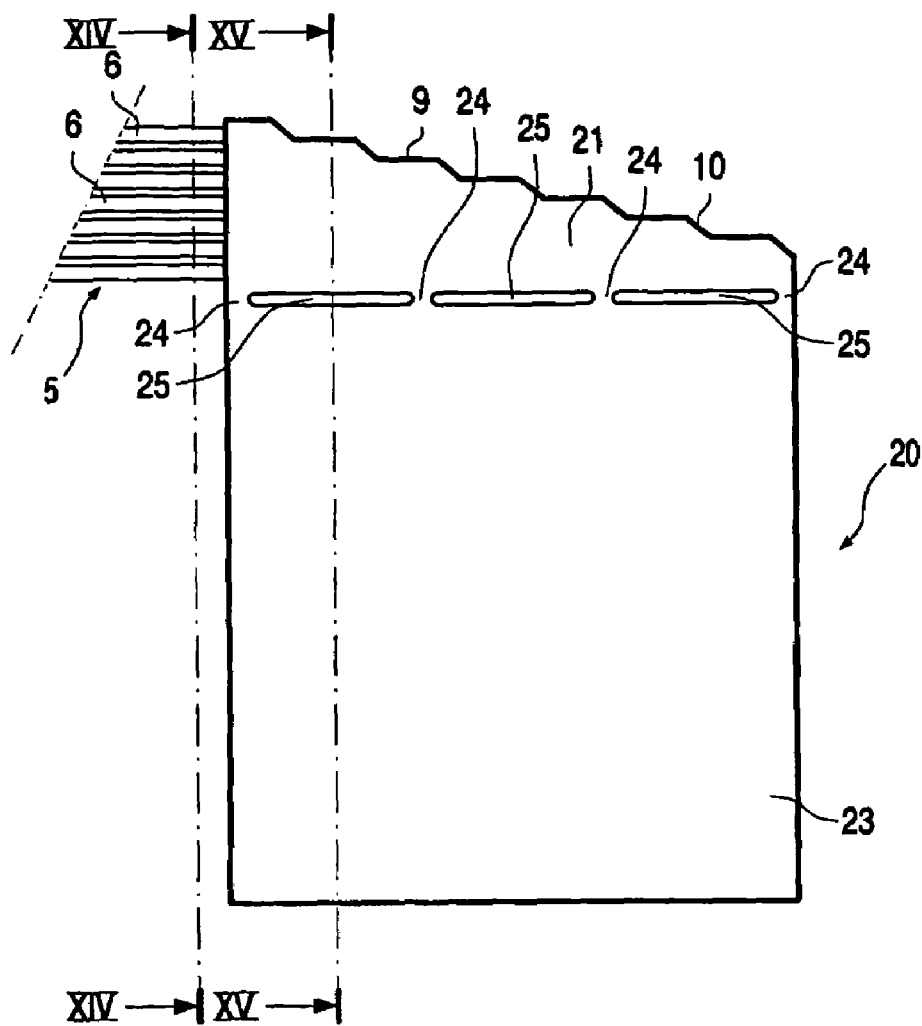
FIG. 10 is a plan view of a system for guiding and emitting light.

FIG. 10 shows an embodiment of a light-guiding system comprising a rectangular plate-like light-emitting element 20 and a substantially triangular plate-like light-guiding member 21, similar to the light-guiding member 1 as described above, reference being made to FIGS. 1-5.

Figure 11:
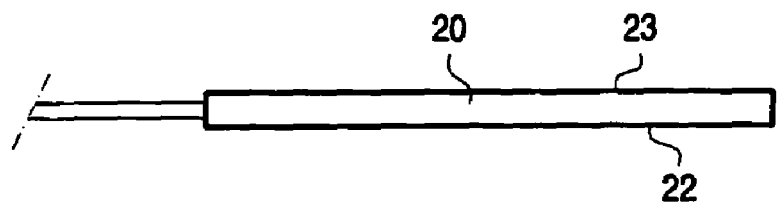
FIG. 11 is a side elevation of the system viewed from the lower side in FIG. 10.
Figure 12:
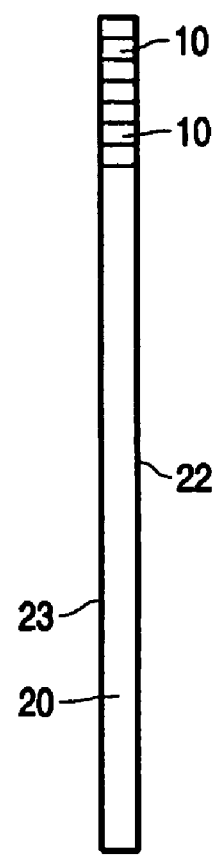
FIG. 12 is a side elevation of the system viewed from the right-hand side in FIG. 10.
Figure 13:
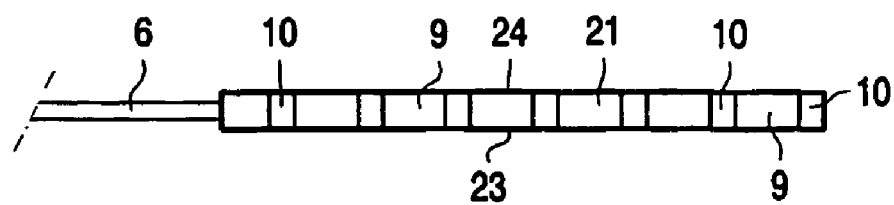
FIG. 13 is a side elevation of the system viewed from the upper side in FIG. 10.
Figure 14:
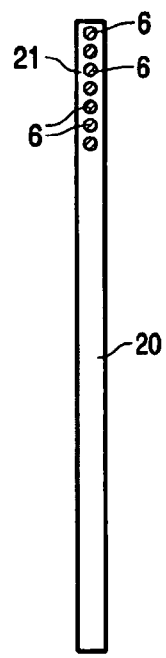
FIG. 14 is a sectional view taken on the line XIV-XIV in FIG. 10.
Figure 15:
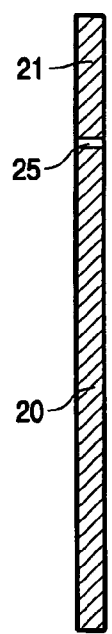
FIG. 15 is a sectional view taken on the line XV-XV in FIG. 10.

According to FIGS. 11-13 (side elevations) and FIGS. 14-15 (sectional views), the plate-like light-emitting element 20 and the light-guiding member 21 are flat, but they may also be curved, resulting in a two-or three-dimensional curved shape. Such a shape may, for example, correspond to the shape of a vehicle roof or a part thereof to which the light-guiding system is to be mounted. If there are only relatively small curves in the plate-like shape, the light will not be coupled out by the curves.

Light is coupled out through the front surface 22 of the light-emitting element 20. To achieve such a light emission, radiation of light inside the element 20 is given a direction corresponding to an angle of incidence towards the front surface of less than the angle of total reflection. In order to obtain such a direction of light radiation, the rear surface 23 or the front surface 22 may have, at least locally, a certain structure obtained by roughening, embossing or boring of the surface of the material. Another possibility is the introduction of scattering centers, such as refractive pigments, in the material of the light-emitting element 20. Anyway, such means for coupling-out light are known per se. The rear surface 23 of the light-emitting element 20 may be coated with light-reflecting material to prevent light radiation through said rear surface 23. It is also possible to mount a mirror at some distance from the rear surface 23, so that light is reflected back into the light-emitting element 20.

In the embodiment shown in FIG. 10, the light-emitting element 20 and the light-guiding member 21 are connected to each other in four locations 24. Between these locations 24 there are three interstices 25, so that the interstices 25 cover the major portion of the area between the light-emitting element 20 and the light-guiding member 21. Although an interstice 25 may extend over a portion of the distance between the front surface 22 and the rear surface 23, so that one of the surfaces 22,23 is uninterrupted, the interstices 25 in the shown embodiment extend over the entire thickness of the light-emitting element 20 and light-guiding member 21, as is clearly shown in FIG. 15. The width of the interstices in this embodiment is about 1 mm. Preferably, the width of the interstices is between 0.05 and 0.15 times the thickness of the light-guiding member 1.

The light-emitting element 20 and the light-guiding member 21 and the light transmission rods 6 are one piece of the same material, in this embodiment polycarbonate, being manufactured in one injection molding operation. The interstices 25 are also formed during this injection molding process. However, the interstices 25 may alternatively be made afterwards, for example by a material-removing operation with a laser beam.

As described above with reference to the substantially triangular light-guiding member 1, the light enters the light-guiding member 21 through the light transmission rods 6 such that the direction of the light radiation is mainly parallel to the longitudinal direction of the rods 6. Then the light is reflected by the surfaces 10 and sent in the direction of the light-emitting element 20, most of the light radiation having a direction substantially perpendicular to the interstices 25. This light will cross the interstices 25 with small losses, passing both surfaces of the interstice 25. However, light radiation having a direction with a large angle to a line perpendicular to the interstice 25 will not cross the interstice 25, but will be reflected back into the material of the light-guiding member 21. Such light radiation can only cross the interstice 25 after being reflected in the light-guiding member 21 once or several times, until its direction allows the passage through the interstice 25.

Owing to the interstices 25, therefore, the light coupled in into the light-emitting element 21 has a direction whereby it can easily reach locations at a relatively large distance to the surface where the light enters the light-emitting element 20. This improves the distribution of the light emission over the front surface 22 of the light-emitting element 20.

Furthermore, the presence of the interstices 25 improves the guidance of light from the light transmission rods 6 to the surface 10 at the right-hand side of FIG. 10, i.e. far away from the rods 6. If a light beam from a lower (in FIG. 10) light transmission rod 6 diverges downwards, it will be reflected by the surface of the interstice 25 and be directed to the surface 10 at the right-hand side of FIG. 10.

The light-guiding member 21 and/or the light-emitting element 20 and/or the light transmission rods 6 may be provided with a coating having a lower refractive index than the material of said member 21, element 20, or rods 6, respectively. Such a coating, or cladding, prevents the surface of the light-guiding material from being contacted by other material or becoming contaminated, for example by fingerprints, with material having the same or a higher refractive index making optical contact with the surface of the light-guiding material, resulting in undesired coupling-out of light. For example, such a cladding makes it possible to attach a fabric against the front surface of the light-emitting element by means of glue such that the light can shine through the fabric. The cladding also allows the fixation of the light-guiding system by means of glue.

The embodiments as described above are merely examples of the light-guiding system; a great many other embodiments are possible.

The invention claimed is:

1. A light-guiding system comprising a plate-like light-emitting element provided with means for emitting light through at least part of its front surface and means for coupling in light into said light-emitting element, characterized in that said means for coupling in light comprise a plate-like light-guiding member that is connected to a lateral side of said light-emitting element and light source means for coupling in light into said light-guiding member, wherein an interstice is present between said light-emitting element and said light-guiding member, said interstice extending over at least part of the area between said light-emitting element and said light-guiding member, and said interstice being directed substantially perpendicularly to said front surface.

2. A light-guiding system as claimed in claim 1, characterized in that a plurality of separate interstices substantially lying in one and the same plane is present.

3. A light-guiding system as claimed in claim 1, characterized in that one or more separate interstices extend over a major portion of the area between said light-guiding member and said light-emitting element.

4. A light-guiding system as claimed in claim 1, characterized in that the distance between the surfaces bordering the interstice is less than 3 mm, preferably between 0.5 mm and 2 mm.

5. A light-guiding system as claimed in claim 1, characterized in that the distance between the surfaces bordering the interstice is between 0.5 and 1.5 times the thickness of the light-emitting element.

6. A light-guiding system as claimed in claim 1, characterized in that said light-emitting element and said light-guiding member are one piece of the same material and are preferably produced in an injection molding operation, whereby both are made together in one operation.

7. A light-guiding system as claimed in claim 1, characterized in that said light-guiding member has a substantially flat plate-like and triangular shape, wherein a shorter side of the triangle comprises a lateral surface for coupling in light into said light-guiding member, wherein a longer side of the triangle comprises a coupling-out surface which faces a surface of a light-emitting element for coupling in light into this light-emitting element, and wherein the third side of the triangle comprises a number of surfaces that are positioned at an angle to the direction of said third side, all said surfaces being perpendicular to the plane of said plate-like shape.

8. A light-guiding system as claimed in claim 1, characterized in that said light source means for coupling in light into said light-guiding member comprise a number of light transmission rods, each of said light transmission rods having an end which is connected to a lateral surface of said plate like light-guiding member.

9. A light-guiding system as claimed in claim 8, characterized in that said light-guiding member and said light transmission rods are one piece of the same material and are preferably produced by an injection molding operation, whereby both are made together in one operation.

10. A light-guiding system as claimed in claim 8, characterized in that the other ends of the light transmission rods are bound together so as to form a member for coupling in light into said light transmission rods.

11. A light-guiding system as claimed in claim 1, characterized in that surfaces of the light-guiding member and/or the light-emitting element and/or the light transmission rods are provided with a coating having a lower refractive index than the material of said member, element, or rods, respectively.

12. A method of coupling in light into a plate-like light-emitting element provided with means for emitting light through at least part of its front surface and means for coupling in light into said light-emitting element, characterized in that light is coupled in by means of a plate-like light-guiding member that is connected to a lateral side of said light-emitting element, whereby light is coupled into said light-guiding member, wherein at least part of the light radiation leaving the light-guiding member and entering the light-emitting element passes an interstice which is present between said light-emitting element and said light-guiding member, said interstice extending over at least part of the area between said light-emitting element and said light-guiding member, and said interstice being directed substantially perpendicularly to said front surface.

13. Apparatus comprising
    a plurality of light tubes
    a light guiding element, made of a material having an index of refraction, and having a substantially flat plate-like triangular shape comprising:
        a shorter side for coupling in light through a lateral surface from the tubes;
        a longer side for coupling out light;
        a hypotenuse comprising
            a first plurality of surfaces along a direction of the hypotenuse, each of the first plurality of surfaces defining a direction parallel to the longer side; and
            a second plurality of surfaces, placed in alternation with the first plurality of surfaces, each of the second plurality of surfaces forming a respective angle with the direction of the first surfaces, the angle being determined from the index of refraction such that
                light from the tubes and incident on the hypotenuse will be reflected toward the longer side without need for reflective material and
                after reflection, the light will be coupled out along the longer side.

14. The apparatus of claim 13, wherein the material of the light guiding element further defines
    a front surface substantially parallel to the light tubes;
    a back surface parallel to the front surface;
    at least one interstice, which interstice
        is an opening through the material from the front surface to the back surface, the opening having an index of reflection distinct from that of the material, and
        extends along a substantial portion of a cross-section of the longer side;
    a light-emitting element, substantially co-planar with the light-guiding element, adapted to emit light through the front surface responsive to optical properties of the material, the second surfaces, and the interstice.

15. The system of claim 1, wherein the interstice is an opening that extends from the front surface to a rear surface of the system.

* * * * *